United States Patent [19]

Ostapchenko

[11] Patent Number: 4,725,481

[45] Date of Patent: Feb. 16, 1988

[54] VAPOR-PERMEABLE, WATERPROOF BICOMPONENT STRUCTURE

[75] Inventor: George J. Ostapchenko, Wilmington, Del.

[73] Assignee: E. I. Du Pont de Nemours and Company, Wilmington, Del.

[21] Appl. No.: 18,338

[22] Filed: Feb. 24, 1987

Related U.S. Application Data

[63] Continuation-in-part of Ser. No. 925,297, Oct. 31, 1986, abandoned.

[51] Int. Cl.$^4$ .............................................. B32B 7/02
[52] U.S. Cl. ..................... 428/213; 428/287; 428/483; 528/301; 528/343
[58] Field of Search ............... 428/213, 287, 483, 480; 528/301; 524/343

[56] References Cited

U.S. PATENT DOCUMENTS

| | | | |
|---|---|---|---|
| 2,865,891 | 12/1958 | Michel | 260/75 |
| 3,023,192 | 2/1962 | Shivers | 260/75 |
| 3,784,520 | 1/1974 | Hoeschele | 260/75 R |
| 4,367,327 | 1/1983 | Holker et al. | 528/61 |
| 4,454,191 | 6/1984 | Von Blucher et al. | 428/244 |
| 4,493,870 | 1/1985 | Vrouenraets et al. | 428/245 |

FOREIGN PATENT DOCUMENTS 16146 10/1969 Japan.
50-35623 10/1976 Japan.

OTHER PUBLICATIONS

Industrial and Engineering Chem., vol. 49, No. 11 (Nov. 1957), pp. 1933-1936.

Primary Examiner—Edith Buffalow

[57] ABSTRACT

(A) A continuous layer of a hydrophobic elastomer having a water vapor transmission rate of 400–2500 gm.mil/m$^2$/24 hrs., said hydrophobic elastomer is a copolyetherester having a multiplicity of recurring long-chain ester units and short-chain ester units, said long-chain ester units being represented by the formula

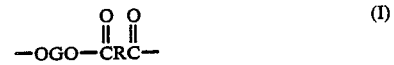

and said short-chain ester units being represented by the formula

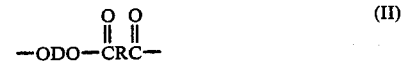

where G is a divalent radical remaining after the removal of terminal hydroxyl groups from a poly(alkylene oxide)glycol having an average molecular weight of about 400–3500, the amount of ethylene oxide groups incorporated in the copolyetherester by the poly(alkylene oxide)glycol is not greater than about 20 weight percent; R is a divalent radical remaining after removal of carboxyl groups from a dicarboxylic acid having a molecular weight less than 300; D is a divalent radical remaining after removal of hydroxyl groups from a diol having a molecular weight less than about 250;

(B) a continuous layer of a hydrophilic elastomer having a water vapor transmission rate of at least 3500 gm.mil/m$^2$/24 hrs., said hydrophilic elastomer is a copolyetherester having a multiplicity of long-chain ester units and short-chain ester units represented by formulae (I) and (II) above and having the values given above with the proviso that the amount of ethylene oxide groups incorporated in the copolyetherester by the poly(alkylene oxide)glycol is from about 25–68 weight percent and said bicomponent film has a separation ratio for water vapor of at least 1.2.

29 Claims, No Drawings

VAPOR-PERMEABLE, WATERPROOF BICOMPONENT STRUCTURE

BACKGROUND OF THE INVENTION

This application is a continuation-in-part of my co-pending U.S. application, Ser. No. 925,297, filed October 31, 1986 now abandoned.

The present invention is directed to a bicomponent structure for use as surgical drape and in waterproof apparel and equipment.

The textile industry has manufactured so-called breathable fabrics composed of a film of a polymeric material that is permeable to water vapor bonded to a textile material. The most notable and successful material that transmits water vapor therethrough is a film of microporous polytetrafluoroethylene that is adhered to a textile material. Although this product has been outstandingly successful, it is rather expensive and the pores tend to be blocked by dirt, body oils and detergents. It is known that other polymers can be formed into films that have a high water-vapor transmission rate and when covered with textile materials, such as nylon or poly(ethylene terephthalate), can be used to make waterproof and water vapor permeable garments. U.S. Pat. No. 4,493,870 discloses waterproof garments made of a textile material that is covered with a single layered film of a copolyetherester made from a dicarboxylic acid, an aliphatic diol and a poly(alkylene oxide)glycol wherein at least 70% of the glycol has a carbon to oxygen ratio of 2.0–2.4. Such waterproof garments described therein have water vapor transmission rate values that do not depend on the film surface facing the high humidity side. The values obtained are equal when either side is exposed to the same level of humidity. There is a need for a waterproof, water vapor permeable product that transmits water vapor at a slower rate from the environment exterior to the protective product than from the interior. For example, shoes or boots fabricated with such a product having the ability to transfer moisture at a higher rate from within, to assure comfort, would keep the wearer's feet drier for a longer period of time under exterior soaking conditions than the products disclosed in U.S. Pat. No. 4,493,870. Up to the time of the present invention, the water vapor transmission rate of the water vapor permeable layer of the product, e.g., a raincoat, was substantially the same in either direction. Japanese Patent Application No. 50-35623, published Oct. 1, 1976, discloses a water vapor permeable product of a single layered film of a copolyetherester elastomer covered with a textile material. The teaching in the Japanese patent application suffers the same deficiencies as those found in U.S. Pat. No. 4,493,870, e.g., the water vapor permeable product transmits water vapor at the same rate from each side of the sheet or film when exposed to the same level of humidity. There is a need in the art for an easily processible, low cost waterproof, water vapor permeable film for use as surgical drape and in waterproof garments or articles having maximum benefit of rapid transmission of water-vapor through the film toward the exterior, or weather side of the garment, or article, while minimizing the transmission of water in the opposite direction, making the garment or article more comfortable to wear due to the increase in the water vapor transmission rate away from the wearer while protecting the wearer from water, liquid and vapor, from exterior sources.

SUMMARY OF THE INVENTION

The present invention is directed to a bicomponent film of a hydrophobic layer and a hydrophilic layer of copolyetherester elastomers bonded together which permits differential transfer of water vapor to prevent buildup of moisture comprising:

(A) a continuous layer of a hydrophobic elastomer 0.05–0.8 mil thick, preferably 0.05–0.3 mil thick, and having a water vapor transmission rate of 400–2500 gm.mil/m²/24 hrs. according to ASTM E96-66 (Procedure BW), said hydrophobic elastomer is a copolyetherester elastomer or a mixture of two or more copolyetherester elastomers having a multiplicity of recurring long-chain ester units and short-chain ester units joined head-to-tail through ester linkages, said long-chain ester units being represented by the formula

and said short-chain ester units being represented by the formula:

where G is a divalent radical remaining after the removal of terminal hydroxyl groups from a poly(alkylene oxide)glycol having an average molecular weight of about 400–3500, and further, the amount of ethylene oxide groups incorporated in the copolyetherester or mixture of two or more copolyetheresters by the poly(alkylene oxide)glycol is not greater than about 20 weight percent based upon the total weight of the copolyetherester or mixture of two or more copolyetheresters; R is a divalent radical remaining after removal of carboxyl groups from a dicarboxylic acid having a molecular weight less than 300; and D is a divalent radical remaining after removal of hydroxyl groups from a diol having a molecular weight less than about 250; and said hydrophobic copolyetherester or mixture of two or more copolyetheresters has from about 25–80 weight percent short-chain ester units;

(B) a continuous layer of a hydrophilic elastomer 0.3–6 mil thick and having a water vapor transmission rate of at least 3500 gm.mil/m²/24 hrs. according to ASTM E96-66 (Procedure BW), said hydrophilic elastomer is a copolyetherester elastomer or a mixture of two or more copolyetherester elastomers having a multiplicity of recurring long-chain ester units and short-chain ester units joined head-to-tail through ester linkages represented by formulae (I) and (II) above and having the values given above with the proviso that the amount of ethylene oxide groups incorporated in the copolyetherester or mixture of two or more copolyetheresters by the poly(alkylene oxide)glycol is from about 25–68 weight percent based on the total weight of the copolyetherester or mixture of two or more copolyetheresters, and the hydrophilic copolyetherester or mixture of two or more copolyetheresters contain about 25–80 weight percent short-chain ester units; and said bicomponent film of the hydrophobic and hydrophilic layers has a separation ratio for water vapor of at least 1.2, preferably at least 1.4 and most preferably at least 1.6, as determined by ASTM E96-66 (Procedure BW).

By ethylene oxide groups in the copolyetherester elastomer is meant the weight percent in the total elastomer of ($CH_2$—$CH_2$—O—) groups in the long-chain ester units.

The ethylene oxide groups in the copolyetherester that are counted to determine the amount in the polymer are those derived from the poly(alkylene oxide)glycol and not ethylene oxide groups that can be introduced into the copolyetherester by means of a low molecular weight diol.

The separation ratio for water vapor means the value of the water vapor transmission rate measured with the hydrophilic layer of the bicomponent film next to the water surface divided by the value of the water vapor transmission rate of the bicomponent film with the hydrophobic layer next to the water surface, as described in ASTM E96-66 (Procedure BW), run at 22° C. The presence of fabric on the bicomponent film has no effect on the value of the separation ratio of the film.

The bicomponent film is especially useful as surgical drape which is used to cover areas of a patients body where surgery is being performed to reduce the possibility of bacterial infection. Also, the bicomponent film is especially adapted to be attached to a textile fabric through the hydrophobic layer to make breathable, water vapor permeable articles such as raincoats, jackets, tents, wet suits, protective apparel, gloves, shoes, boots, car covers, etc.

The bicomponent film of the present invention has a much higher water vapor transmission rate (WVTR), as measured by ASTM E96-66 (Procedure BW), when water vapor passes in the direction of the hydrophilic layer of film and then through the hydrophobic layer of the film of the bicomponent structure, as contrasted to the passage of water vapor from the hydrophobic layer of film and then through the hydrophilic layer of film. When the bicomponent film structure of this invention is used as surgical drape and the hydrophilic layer of film is placed next to the patient's skin, accumulation of water vapor under the surgical drape next to the wound or on the patient's skin is substantially reduced due to the higher rate of water vapor transmission from the hydrophilic layer through the hydrophobic layer. The nonporosity of the bicomponent film lessens the probability of infection caused by contamination of the area. In addition, the higher rate of water vapor transmission of the hydrophilic layer is useful when the bicomponent film is used in apparel, such as raincoats, jackets and shoe lining. For example, when the bicomponent film of the present invention is used for making raincoats and a textile material is attached, by melt bonding or by adhesive bonding, to the hydrophobic layer of the film, the water vapor transmission rate is substantially higher for water vapor passing in the direction of the hydrophilic layer of the film to and through the hydrophobic layer of the film than in the other direction. Consequently, the wearer of the raincoat enjoys more comfort because water vapor accumulating on the inside of the coat next to the hydrophilic layer of the bicomponent film is less than that amount that would accumulate if the WVTR was about the same in each direction.

DETAILED DESCRIPTION OF THE INVENTION

The term "long-chain ester units" as applied to units in a polymer chain refers to the reaction product of a long-chain glycol with a dicarboxylic acid. Such "long-chain ester units", which are repeating units in the copolyetheresters of this invention, correspond to the Formula (I) above. The long-chain glycols are polymeric glycols having terminal (or as nearly terminal as possible) hydroxy groups. The molecular weight of polymeric glycols used to make the copolyetheresters for the hydrophobic film or the hydrophilic film is from about 400–3500.

The poly(alkylene oxide)glycol used to make the hydrophobic copolyetherester elastomer can contain ethylene oxide groups such that the total weight is less than about 20 weight percent based on the total weight of the polymer. In many instances, the poly(alkylene oxide)glycol used to make the copolyetherester does not contain any ethylene oxide and, consequently, the resulting copolyetherester does not contain ethylene oxide residues. However, poly(alkylene oxide)glycols that contain ethylene oxide groups in amounts that result in a copolyetherester having no more than about 20 weight percent ethylene oxide groups, preferably, not greater than about 15 weight percent, based on the elastomer, can be used because the resulting copolyetheresters have a sufficiently low degree of water vapor permeability, i.e., not greater than about 2500 gm.mil/$m^2$/24 hrs. Representative poly(alkylene oxide)glycols that can be used to form the long-chain ester units of the hydrophobic copolyetherester have molecular weights from 400–3500, usually 600–1500, and include poly(1,2- and 1,3-propylene oxide)glycol, poly(tetramethylene oxide)glycol, random or block copolymers of ethylene oxide and 1,2-propylene oxide of the proper proportions and random or block copolymers of tetrahydrofuran with minor amounts of a second monomer such as methyltetrahydrofuran used in proportions such that the ethylene oxide content will result in a copolyetherester having no more than about 20 weight percent ethylene oxide groups. Preferably, the poly(alkylene oxide)glycols used to make the hydrophobic film are poly(tetramethylene ether)glycol or ethyleneoxide capped polypropylene oxide glycol.

The poly(alkylene oxide)glycol used to make the hydrophilic copolyetherester elastomer must contain ethylene oxide groups in amounts sufficient to result in a copolyetherester having from about 25-68 weight percent ethylene oxide groups based on the total weight of the copolyetherester elastomer. The ethylene oxide groups cause the polymer to have the characteristic of being readily permeable to water vapor and, generally, the higher the percentage of ethylene oxide in the copolyetherester, the higher the degree of water vapor permeability. Random or block copolymers of ethylene oxide containing minor portions of a second poly(alkylene oxide)glycol can be used. Generally, if a second monomer is present, the second monomer will constitute less than about 30 mol percent of the poly(alkylene oxide)glycols, and, usually, less than about 20 mol percent. Representative long-chain glycols used to prepare the copolyetheresters that form the hydrophilic film have molecular weights of from 400–3500, usually 600–1500, and include: poly(ethylene oxide)glycol, ethylene-oxide capped polypropylene oxide glycol, mixtures of poly(ethylene oxide)glycol with other glycols such as ethylene oxide capped poly(propylene oxide)glycols and/or poly(tetramethylene oxide)glycol provided the resulting copolyetherester has an amount of ethylene oxide groups of at least about 25 weight percent. Copolyetheresters prepared from poly(ethylene oxide)glycols having a molecular weight of from about 600 to 1500 are preferred because they provide a combination of superior water-vapor permeability and limited water swell and, when formed into a film, they exhibit useful properties over a wide temperature range.

The term "short-chain ester units" as applied to units in a polymer chain of the copolyetheresters forming the hydrophobic layer or the hydrophilic layer of the bicomponent film refers to low molecular weight compounds or polymer chain units having molecular weights less than about 550. They are made by reacting a low molecular weight diol or a mixture of diols (MW below about 250) with a dicarboxylic acid to form ester units represented by Formula (II) above.

Preferably, the melting point of the copolyetherester of the hydrophobic and hydrophilic elastomers is greater than 120° C., usually from about 120° C. to above about 220° C. If the melting point of the copolyetherester is less than about 120 C, then the polymer is tacky and difficult to handle in film form; and if the melting point is more than about 220° C., then the films become excessively stiff. The melting points are determined by differential scanning calorimeter (DSC).

Included among the low molecular weight diols which react to form short-chain ester units suitable for use for preparing copolyetheresters forming either the hydrophobic or hydrophilic layer of the bicomponent film are acyclic, alicyclic and aromatic dihydroxy compounds. Preferred compounds are diols with 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, most especially 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the copolyetheresters used in this invention for both the hydrophobic and hydrophilic layers of the bicomponent films are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid, decahydro-1,5-naphthylene dicarboxylic acid, 4,4,'-bicyclohexyl dicarboxylic acid, decahydro-2,6-naphthylene dicarboxylic acid, 4,4,'-methylenebis(cyclohexyl) carboxylic acid, 3,4-furan dicarboxylic acid. Preferred acids are cyclohexane-dicarboxylic acids and adipic acid.

Representative aromatic dicarboxylic acids which can be used to make the copolyetheresters used to form films include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4,'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used providing an aromatic dicarboxylic acid is also present.

Aromatic dicarboxylic acids are a preferred class for preparing the copolyetherester polymers useful for making the bicomponent films of this invention. Among the aromatic acids, those with 8-16 carbon atoms are preferred, particularly terephthalic acid alone or with a mixture of phthalic and/or isophthalic acids.

As described above, the copolyetherester elastomers forming the hydrophilic layer of the bicomponent film are similar to the copolyetherester elastomers forming the hydrophobic layer of the bicomponent film with the exception of the amount of ethylene oxide groups in the copolyetherester. In Formula (I) above, G for the hydrophilic copolyetherester or hydrophobic copolyetherester is a divalent radical remaining after the removal of terminal hydroxyl groups from a poly(alkylene oxide)glycol having a molecular weight of about 400-3500. The poly(alkylene oxide)glycol used for the hydrophilic copolyester has sufficient ethylene oxide groups such that the resulting copolyetherester has an ethylene oxide content of from about 25-68 weight percent, preferably, from about 30-55 weight percent. The poly(alkylene oxide)glycol used for the hydrophobic copolyester has an ethylene oxide content of from 0-20 weight percent.

The copolyetheresters used to make the hydrophilic layer of the bicomponent film of the present invention contain about 25-80 weight percent short-chain ester units, preferably about 40-60 weight percent, corresponding to Formula (II) above, the remainder being long-chain ester units corresponding to Formula (I) above. When the copolyetherester elastomers used for the hydrophilic layer of the bicomponent film contain less than about 25 weight percent short-chain ester units, then the crystallization rate becomes very slow and the copolyetherester is tacky and difficult to handle. When the copolyetherester elastomers used in the the hydrophilic layer contain more than about 80 weight percent short chain-ester units, then the copolyetherester films are too stiff. The preferred balance of properties is obtained when the short-chain ester units are from about 40-60 weight percent.

The copolyetheresters used to make the hydrophobic layer of the bicomponent film that is 0.05-0.8 mil thick contain about 25-80 weight percent short-chain ester units, preferably about 30-60 weight percent, corresponding to Formula (II) above, the remainder being long-chain ester units corresponding to Formula (I) above. In general, as percent short-chain ester units in the copolyetherester are increased, the polymer has a higher tensile strength and modulus, and the water vapor transmission rate decreases. Most preferably, for both the copolyetheresters forming the hydrophilic layer and the hydrophobic layer of the bicomponent film, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyetherester, isophthalic acid is the acid of choice and if a second low molecular weight diol is used, 1,4-butenediol or hexamethylene glycol are the diols of choice.

The hydrophobic and hydrophilic layers of the bicomponent film can be a blend or mixture of two or more copolyetherester elastomers. The copolyetherester elastomers used in the blend need not on an individual basis come within the values disclosed hereinabove for the elastomers. However, the blend of two or more copolyetherester elastomers that forms either the hydrophobic or hydrophilc layers must conform to the values described herein for the copolyetheresters on a weighted average basis. For example, in a mixture used to make the hydrophilic layer of the bicomponent film that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units in the hydrophilic layer of the bicomponent film.

The water vapor transmission rate of the hydrophobic layer and hydrophilic layer constituting the bicomponent film can be regulated by various means. Obviously, the thickness of the layer of copolyetherester has an effect on the value of the water vapor transmission rate, the thinner the layer the higher the value. An increase in the percent of short-chain ester units in the copolyetherester used to make a layer of the bicomponent film results in a decrease in the value of the water vapor transmission rate, but an increase in the value of the tensile strength of the layer due to the fact the polymer is more crystalline. Usually, the water vapor transmission rate for the hydrophobic layer is from 400-2500 gm.mil/m$^2$/24 hours according to ASTM E96-66 (Procedure BW), preferably 800-1200 gm.mil/m$^2$/24 hours. The water vapor transmission rate for the hydrophilic layer is at least 3500 gm.mil/m$^2$/24 hours according to ASTM E96-66 (Procedure BW), preferably 3500-20,000 gm.mil/m$^2$/24 hours.

The Young's moduli of the copolyetherester elastomers used to make the hydrophobic layer and hydrophilic layer preferably are from 1000 to 14,000 psi, usually 2000 to 10,000 psi, as determined by ASTM Method D-412. The modulus can be controlled by the ratio of short-chain segments to long-chain segments of the copolyetherester elastomer, and comonomer choice for preparation of the copolyetherester. The importance of using copolyetheresters having a relatively low modulus is better stretch recovery and aesthetics of the composite structure when attached to textile materials for the manufacture of wearing apparel, such as jackets and raincoats, where the stiffness and drape of the garment are important for comfort.

The most preferred copolyetherester elastomers used to make the hydrophilic layer of the bicomponent film are those prepared from esters of terephthalic acid, e.g., dimethylterephthalate, 1,4-butanediol and poly(ethylene oxide)glycol. The most preferred copolyetherester elastomers used to make the hydrophobic layer of the bicomponent film are those prepared from esters or mixtures of esters of terephthalic acid and isophthalic acid, 1,4-butanediol and poly(tetramethylene ether)glycol or ethylene oxide-capped polypropylene oxide glycol.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol. The copolyetherester elastomers used to make the hydrophobic layer and the hydrophilic layer of the bicomponent film described herein can be made conveniently by a conventional ester interchange reaction. A preferred procedure involves heating the ester of an aromatic acid, e.g., dimethyl ester of terephthalic acid, with the poly(alkylene oxide)glycol and a molar excess of the low molecular weight diol, 1,4-butanediol, in the presence of a catalyst at 150°-260° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm. pressure and 240°-260° C. for less than 2 hours in the presence of antioxidants such as 1,6-bis-[3,5-di-tert-butyl-4-hydroxyphenol)propionamido]-hexane or 1,3,5-trimethyl-2,4,6-tris[3,5-ditertiary-butyl-4-hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetheresters possess many desirable properties, it is sometimes advisable to stabilize these compositions further against heat or light produced degradation. Fortunately, this can be done very readily by incorporating stabilizers in the copolyetherester compositions. Satisfactory stabilizers comprise phenols, especially hindered phenols and their derivatives, amines and their derivatives, especially arylamines.

Representative phenol derivatives useful as stabilizers include 4,4,'-bis(2,6-di-tertiarybutylphenol); 1,3,5-trimethyl-2,4,6-tris[3,5-ditertiary-butyl-4-hydroxybenzyl]benzene and 1,6-bis[3,5-di-tert-butyl-4-hydroxyphenyl)propionamido]hexane. Mixtures of hindered phenols with costabilizers such as diaurylthiodipropionate or phosphites are particularly useful. Improvement in light stability occurs by the addition of small amounts of pigments or the incorporation of a light stabilizer, such as benzotriazole ultraviolet light absorbers. The addition of hindered amine photostabilizers, such as bis(1,2,2,6,6-pentamethyl-4-piperidinyl) n-butyl-(3,5-di-tert-butyl-4-hydroxybenzyl)malonate, usually in amounts of from 0.05–1.0% by weight of the copolyetherester, are particularly useful in preparing compositions having resistance to photodegradation.

Various conventional fillers can be added to the copolyetheresters usually in amounts of from about 1–10 percent by weight of the copolyetherester or mixture of copolyetheresters that form layers of the bicomponent film. Fillers such as clay, talc, alumina, carbon black, silica can be used, the latter being preferred, and white and light colored pigments can be added to the polymers. In general, these additives have the effect of increasing the modulus at various elongations. It is advantageous to add the inorganic filler in finely divided form to the hydrophilic copolyetherester used to make apparel and the like to improve the slip and blocking characteristics of the hydrophilic layer to give improved sewability and aesthetics without sacrificing the integrity of adhesion of the layer to the textile material.

Any suitable textile material used for the manufacture of rainwear, jackets, protective clothing, tents and the like can be attached, preferably by melt bonding or adhesive bonding, to the hydrophobic layer of the bicomponent film. The hydrophobic layer is an essential part of the bicomponent film. The hydrophobic layer substantially covers one surface of the hydrophilic layer forming the bicomponent film. The hydrophobic layer functions as a means of controlling the WVTR separation ratio and facilitates adhesive bonding to textile materials as compared to the bond of a single layer film of hydrophilic material. Also, when the polymer forming the hydrophobic layer has a sufficiently lower melting point than the copolyetherester forming the hydrophilic layer (at least about 10.C less), it can function as an adhesive for bonding textile material, woven or nonwoven, to it while the higher melting hydrophilic layer is unsoftened and maintains the integrity of the bicomponent film to form a flexible layered product that can be fabricated into wearing apparel, etc. In addition, the copolyetherester hydrophobic layer of film that is coextruded with the hydrophilic layer of film results in a strong bond between the layers because of the chemical similarity of the copolyetherester elastomers forming the bicomponent film. Usually, the textile materials used are polyethylene terephthalate, or polyamides such as nylon 6, or nylon 66, cotton, cellulose triacetate, etc. The textile materials are attached to or bonded to the hydrophobic layer of the bicomponent film to make a layered product. Usually conventional materials, such as fluorocarbons and silicones, are coated or sprayed on the textile material to render it more water-repellant.

The composite structure of the hydrophobic layer of the bicomponent film and the hydrophilic layer of the film results in a much higher WVTR for the passage of water vapor through, first, the hydrophilic layer and then through the hydrophobic layer, than the passage of water vapor through, first, the hydrophobic layer and then through the hydrophilic layer when the water vapor source is next to the hydrophobic layer. Garments made from the bicomponent film have the hydrophilic layer on the inside next to the wearer and, therefore, since the WVTR is higher in the direction from the hydrophilic layer through the hydrophobic layer, it has a beneficial cooling effect on the wearer of the garment. Such garments keep out snow and rain without keeping in perspiration.

The hydrophobic and hydrophilic layers forming the bicomponent films of the present invention behave like a permeability valve. The permeability of the bicomponent film structure is not linear with vapor pressure (relative humidity). As the relative humidity is increased, the hydrophilic layer absorbs water in an amount determined by its composition which causes it to swell and become more permeable. The higher the weight percent long-chain ester units in the copolyetherester, the higher the water swell capability of the polymer. As a consequence, when the hydrophilic layer of the bicomponent film is next to the water source, the value of the water vapor transmission rate is about two to three times higher than when the hydrophobic layer is next to the water source. The bicomponent film of the hydrophobic copolyetherester elastomer and the hydrophilic copolyetherester elastomer is made by a conventional coextrusion procedure. The chemical similarities in structure and composition and melt viscosity behavior of the copolyetherester elastomers result in uniform layers of the bicomponent film with excellent adhesion between layers.

Briefly, the process for making the bicomponent film by coextrusion is as follows. The copolyetherester and additives, if any, forming the hydrophilic layer of the bicomponent film is fed to one extruder and the copolyetherester and additives, if any, forming the hydrophobic layer is fed to a second extruder. The polymers in the extruders are heated above their melting points, which should differ by at least about 10.C. when a textile material is to be melt bonded to the hydrophobic layer, and each layer is passed to a conventional melt combining block connected to the extruders where the extruded layers are contacted one on top of the other. The layers then pass through a flat die connected to the combining block where the coextruded layers adhere to each other and form a bicomponent film structure. The bicomponent film coming out of the die is melt coated on a support substrate, such as lightweight polyester film, release paper, etc., and the bicomponent film is wound and stored for use. The bicomponent film can be used, for example, as surgical drape.

If it is desired to make a bicomponent film structure into material for fabrication into a raincoat, jacket or other garment, or tent, etc., the bicomponent film is bonded to a textile material, such as poly(ethylene terephthalate), by thermal lamination of the bicomponent film on hot roll calendering equipment with the hydrophobic layer of the film next to the textile material. Briefly, one such procedure is as follows. The temperature used to bond the textile material to the hydrophobic layer of the bicomponent film is sufficient to melt the hydrophobic layer, but not the hydrophilic layer, and with the application of sufficient pressure, the layers are bonded. The resulting flexible layered product can be made into wearing apparel, tents, etc.

The following examples are illustrative of the invention in which parts and percentages are by weight unless otherwise indicated.

EXAMPLES

Ingredients Used

Copolyetherester A forming the hydrophilic layer of the film contained 49.9 weight percent 1,4-butylene terephthalate and 50.1 weight percent poly(ethylene oxide) terephthalate and the poly(alkylene oxide)glycol used to make the copolyetherester had a molecular weight of 1450. The copolyetherester had a calculated ethylene oxide content of 46.0 weight percent and contained 49.9 weight percent short-chain ester units. The polymer had a melting point of 194° C. and a water vapor transmission rate (WVTR) of 18,500 gm.mil/m$^2$/24 hrs.

Copolyetherester B forming the hydrophobic layer of the film contained 38 weight percent 1,4-butylene terephthalate, 11 weight percent 1,4-butylene isophthalate, 39.6 weight percent poly(tetramethylene ether) terephthalate and 11.4 weight percent poly(tetramethylene ether)isophthalate. The poly(alkylene oxide)glycol used to make the copolyetherester had a molecular weight of 1000. The ethylene oxide content of the copolyetherester was zero. The polymer contained 49 weight percent short-chain ester units, and had a melting point of 148° C. and a WVTR of 450 gm.mil/m$^2$/24 hrs.

Copolyetherester C forming the hydrophobic layer of the film contained 20.3 weight percent 1,4-butylene terephthalate, 7.9 weight percent 1,4-butylene isophthalate, 51.7 weight percent poly(tetramethylene ether)glycol terephthalate, 20.1 weight percent poly(tetramethylene ether)isophthalate and the poly(alkylene oxide)glycol used to make the copolyetherester had a molecular weight of 2000. The ethylene oxide content of the copolyetherester was zero. The polymer contained 28.2 weight percent short-chain ester units, had a melting point of 124° C. and a WVTR value of 1300 gm.mil/m$^2$/24 hrs.

Copolyetherester D forming the hydrophilic layer of the film contained 25 weight percent 1,4-butylene terephthalate, 50 weight percent poly(ethylene oxide) terephthalate where the molecular weight of the poly(alkylene oxide)glycol used to make the copolyetherester was 1450, and 25 weight percent poly(tetramethylene ether) terephthalate wherein the poly(alkylene oxide)glycol had a molecular weight of 2000. The copolyetherester had a calculated ethylene oxide content of 45.8 weight percent and contained 25 weight percent short-chain ester units. The polymer had a melting point of 150° C. and a WVTR of 17500 gm.mil/m$^2$/24 hrs.

Copolyetherester E forming the hydrophobic layer of the film contained 31 weight percent 1,4-butylene terephthalate, 9 weight percent 1,4-butylene isophthalate, and 46.5 weight percent ethylene oxide/propylene oxide copolyether terephthalate and 13.5 weight percent ethylene oxide/propylene oxide copolyether isophthalate. The copoly(alkylene oxide)glycol used to make the copolyetherester was obtained by end-capping poly(propylene ether)glycol with 30 weight percent ethylene oxide and had a molecular weight of 2150. The copolyetherester had a calculated ethylene oxide content of 17 weight percent and contained 40 weight percent short-chain ester units. The polymer had a melting point of 155° C. and a WVTR of 2240 gm.mil/m$^2$/24 hrs.

Tests Used

Water vapor transmission rate (WVTR) was determined by ASTM E96-66 (Procedure BW), run at 22° C.

EXAMPLE 1

Copolyetherester A was fed to a 1.5 inch diameter extruder connected to a melt combining block. Copolyetherester B was fed to a 1 inch diameter extruder that was also connected to the same melt combining block. Copolyetherester A was heated to 205° C. and coextruded at 20 rpm's and Copolyetherester B was heated to 205° C. and coextruded at 5 rpm's to the melt combining block connected to the extruders. The coextruded layers were combined in the melt block. The layers were then passed through a die connected to the combining block having a 14 inch wide die block heated to about 205° C. A bonded bicomponent film was formed exiting from the die that had a combined thickness of 1 mil. Copolyetherester A, the hydrophilic layer, was 0.9 mil (0.0229 mm), and Copolyetherester B, the hydrophobic layer was 0.1 mil (0.0025 mm) thick. The bicomponent film exiting from the die was coated on a nonwoven lightweight scrim fabric of spun bonded polyethylene terephthalate as a substrate with the hydrophilic layer next to the scrim fabric. The WVTR of the bicomponent film with the scrim substrate was determined according to ASTM E96-66 (Procedure BW). The WVTR value with the hydrophilic layer facing the water was 3890 gm.mil/m$^2$/24 hrs. and with the hydrophobic layer of the bicomponent film facing the water the WVTR value was only 1850 gm/m$^2$/24 hrs. which results in a water vapor separation ratio of 2.1.

EXAMPLE 2

The procedure described above in Example 1 was repeated except that hydrophobic Copolyetherester C (which had a WVTR of 1310 gm.mil/m$^2$/24 hrs.) was substituted in the same amount and extruded under the same conditions as hydrophobic Copolyetherester B. Release paper was used as a substrate in place of scrim fabric and removed from the bicomponent film before water vapor permeability was determined. The coextruded bicomponent film had a WVTR of 8450 gm.mil/m$^2$/24 hrs. when measured with the water in contact with Copolyetherester A during the test, and only 4120 gm.mil/m$^2$/24 hrs. when measured with the water in contact with Copolyetherester C for a water vapor separation ratio of 2.05.

EXAMPLES 3-4

The procedure described above in Example 1 was repeated except that Copolyetherester C was substituted for Copolyetherester B for the hydrophobic layer of the bicomponent film. Also, the total thickness of the extruded films of the bicomponent structures were 3.1 mils (Example 3) and 6.5 mils (Example 4), respectively, and they have different thickness layer fractions, as shown in Table I, caused by varying the screw speed and line speed of the apparatus. Release paper was used as a substrate rather than scrim fabric and removed before water vapor permeability was determined.

The total thickness and fraction of polymer in each of the films described in Table II was determined by photomicrograph of measurements of cross-sections, as shown in Table I, along with the water vapor transmission rates (WVTR) as measured by ASTM E96-66 (Procedure BW).

TABLE I

| Example | Copolyetherester C Fraction | WVTR (I) | WVTR (D) | Separation Ratio WVTR (I)/WVTR (D) |
|---|---|---|---|---|
| 3 | .13 | 11410 | 4774 | 2.3 |
| 4 | .47 | 3600 | 2366 | 1.5 |

WVTR = gm-mil/m$^2$-24 hrs
WVTR (I) = hydrophilic side facing water
WVTR (D) = hydrophobic side facing water The data in Table I shows that the water vapor separation ratio (WVTR(I)/WVTR(D)) goes through a maximum between a Copolyetherester C fraction of 0 (ratio=1.0) and 0.47.

EXAMPLES 5-6

The procedure described above in Example 1 was repeated except that Copolyetherester E was substituted in Examples 5 and 6 for Copolyetherester B and extruded in a 1 inch diameter extruder at 10 rpm. Copolyetherester A was used in Example 5 and Copolyetherester D was used in Example 6, both containing 6 percent by weight diatomaceous earth. The copolyetherester elastomers were extruded in a 01.5 inch diameter extruder in each case at 20 rpm. The resulting bicomponent film of Copolyetheresters A and E (Example 5) and Copolyetheresters D and E (Example 6) were melt coated onto a polyethylene terephthalate film (MYLAR ®) substrate. In each example, the total film thickness of the bicomponent film structure was 0.65 mils and the thickness fraction of Copolyetherester E was 0.2. The WVTR measured by ASTM E96-66 BW after removal of the MYLAR ® substrate and the calculated water vapor separation ratios are given below.

TABLE II

| Example | WVTR (I) | WVTR (D) | Separation Ratio WVTR (I)/WVTR (D) |
|---|---|---|---|
| 5 | 6351 | 4130 | 1.54 |
| 6 | 8126 | 5805 | 1.40 |

WVTR = gm · mil/m$^2$/24 hrs.
WVTR (I) = hydrophilic side facing water
WVTR (D) = hydrophobic side facing water

EXAMPLE 7

The bicomponent film structure of Example 1 with the scrim fabric substrate was heat laminated with a variety of textile materials (a) nylon taffeta, (b) polyester cotton blend, and (c) Lycra ® spandex fiber. The hydrophobic layer, i.e., Copolyetherester B, was placed next to the textile material and a flexible layered product was manufactured on a Verduin Calender which is composed of a rubbery roll mounted above a heated roll. In each case, the bicomponent film structure with the textile material next to the layer of Copolyetherester B was fed through the rolls of the calender at a rate of 13 feet per minute using a force of 40 tons at the nip of the rolls and the lower roll was heated to 170° C. In each case, the bicomponent film structure of the resulting flexible layered product could not be peeled from the textile material without tearing. The WVTR of the bicomponent film structure and textile material with the hydrophilic side facing the water was 4705 gm.mil/m²/24 hrs for the nylon taffeta sample, 3711 gm.mil/m²/24 hrs for the polyester cotton blend sample and 4772 gm.mil/m²/24 hrs Lycra ® spandex sample.

EXAMPLE 8

The bicomponent films described in Examples 5 and 6 were each adhesively laminated to a nylon taffeta textile material on a conventional laminating apparatus that was an Intra-roto coating and laminating machine, which comprises an adhesive applicator, an oven to remove the adhesive solvent and a heated laminating roll.

The hydrophobic side of each bicomponent film was coated with a polyurethane adhesive ("Adcote" 503-A) which was dissolved in methyl ethyl ketone using a No. 84 gravure roll. After coating each hydrophobic layer with the adhesive, the bicomponent films were passed through an oven heated to 82° C. to remove the solvent. The fabric was unwound from a roll on the laminating side of the machine and combined with the adhesive coated layer and then nipped onto the heated roll (121° C.) to bond the bicomponent film on the hydrophobic side to the fabric, thus forming the flexible layered products. The line speed of the laminator in each case was 10 feet per minute.

The bicomponent film could not be peeled from the fabric without tearing, indicating good bond strength between the film and fabric. For the bicomponent films described in Examples 5 and 6 above, the WVTR of the flexible product (the bicomponent film and fabric) measured with the water next to the bicomponent film was 2551 and 3490 gm.mil/m²/24 hrs., respectively.

EXAMPLE 9

Concentrate F in the form of pellets consisted of 80 weight percent of hydrophilic Copolyetherester D and 20 weight percent of silica ("Super-Floss") was prepared by first dry blending the ingredients, followed by melt blending using a 28 mm twin screw extruder at 215° C. melt temperature. A physical blend consisting of 70 weight percent hydrophilic Copolyetherester A and 30 weight percent Concentrate F was fed to a 2.5 inch diameter extruder connected to a melt combining block. Hydrophobic Copolyetherester C was fed to a 1 inch diameter extruder that was also connected to the same melt combining block. The blend of Concentrate F and Copolyetherester A was heated to 205° C. in the 2.5 inch extruder and coextruded at a screw speed of 40 rpm and Copolyetherester C was heated to 205° C. and coextruded at 22 rpm. The layers then passed through a 60 inch wide film die heated to about 205° C. A bonded bicomponent film was formed exiting the die that had a combined thickness of about 0.5 mil. The layer formed by the blend of Concentrate F and Copolyetherester A was 0.45 mils and the layer formed by Copolyetherester C was about 0.05 mils. The bicomponent film comprised a blend of copolyetherester elastomers that contained a silica filler formed the hydrophilic layer. The bicomponent film had a water vapor transmission rate of 5391 gm.mil/m²/24 hrs., ASTM E96-66 (Procedure BW), when measured with the water in contact with the layer formed by the blend of Concentrate F and Copolyetherester A (the hydrophilic layer) and only 4452 gm.mil/m²/24 hrs. when measured with the water in contact with hydrophobic layer of Copolyetherester C thus giving a separation ratio of 1.21.

The above examples show, among other things, that both the water vapor permeability and water vapor permeability ratio of the bicomponent film structure can be regulated by proper choice of polymers, including blends, composite film thickness and individual layer thickness.

I claim:

1. A bicomponent film of a hydrophobic layer and a hydrophilic layer of copolyetherester elastomers bonded together which permits differential transfer of water vapor to prevent buildup of moisture comprising:
(A) a continuous layer of a hydrophobic elastomer 0.05–0.8 mil thick and having a water vapor transmission rate of 400–2500 gm.mil/m²/24 hrs. according to ASTM E96-66 (Procedure BW), said hydrophobic elastomer is a copolyetherester elastomer or a mixture of two or more copolyetherester elastomers having a multiplicity of recurring long-chain ester units and short-chain ester units joined head-to-tail through ester linkages, said long-chain ester units being represented by the formula

and said short-chain ester units being represented by the formula:

where G is a divalent radical remaining after the removal of terminal hydroxyl groups from a poly(alkylene oxide)glycol having an average molecular weight of about 400–3500, and further, the amount of ethylene oxide groups incorporated in the copolyetherester or mixture of two or more copolyetheresters by the poly(alkylene oxide)glycol is not greater than about 20 weight percent based upon the total weight of the copolyetherester or mixture of two or more copolyetheresters; R is a divalent radical remaining after removal of carboxyl groups from a dicarboxylic acid having a molecular weight less than 300; D is a divalent radical remaining after removal of hydroxyl groups from a diol having a molecular weight less than about 250; and said hydrophobic copolyetherester or mixture of two or more copolyetheresters has from about 25–80 weight percent short-chain ester units;

(B) a continuous layer of a hydrophilic elastomer 0.3–6 mil thick and having a water vapor transmission rate of at least 3500 gm.mil/m²/24 hrs. according to ASTM E96-66 (Procedure BW), said hydrophilic elastomer is a copolyetherester elastomer or a mixture of two or more copolyetherester elastomers having a multiplicity of long-chain ester units and short-chain ester units joined head-to-tail through ester linkages represented by formulae (I) and (II) above and having the values given above with the proviso that the amount of ethylene oxide groups incorporated in the copolyetherester or mixture of two or more copolyetheresters by the poly(alkylene oxide)glycol is from about 25–68 weight percent based on the total weight of the copolyetherester or mixture of two or more copolyetheresters, and the hydrophilic copolyetherester or mixture of two or more copolyetheresters contain about 25-80 weight percent short-chain ester units; and said bicomponent film of the hydrophobic and hydrophilic layers has a separation ratio for water vapor of at least 1.2 as determined by ASTM E96-66 (Procedure BW).

2. A bicomponent film of claim 1 wherein the continuous layer of the hydrophilic elastomer comprises a mixture of copolyetheresters.

3. A bicomponent film of claim 1 wherein the continuous layer of the hydrophilic elastomer contains an inorganic filler.

4. A bicomponent film of a hydrophobic layer and a hydrophilic layer of copolyetherester elastomers bonded together which permits differential transfer of water vapor to prevent buildup of moisture comprising:
(A) a continuous layer of a hydrophobic elastomer 0.05-0.8 mil thick and having a water vapor transmission rate of 400-2500 gm.mil/m²/24 hrs. according to ASTM E96-66 (Procedure BW), said hydrophobic elastomer is a copolyetherester elastomer having a multiplicity of recurring long-chain ester units and short-chain ester units joined head-to-tail through ester linkages, said long-chain ester units being represented by the formula

(I)

and said short-chain ester units being represented by the formula:

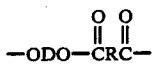
(II)

where G is a divalent radical remaining after the removal of terminal hydroxyl groups from a poly(alkylene oxide)glycol having an average molecular weight of about 400-3500, and further, the amount of ethylene oxide groups incorporated in the copolyetherester by the poly(alkylene oxide)glycol is not greater than about 20 weight percent based upon the total weight of the elastomer; R is a divalent radical remaining after removal of carboxyl groups from a dicarboxylic acid having a molecular weight less than 300; D is a divalent radical remaining after removal of hydroxyl groups from a diol having a molecular weight less than about 250; and said hydrophobic copolyetherester has from about 25-80 weight percent short-chain ester units;
(B) a continuous layer of a hydrophilic elastomer 0.3-6 mil thick and having a water vapor transmission rate of at least 3500 gm.mil/m²/24 hrs. according to ASTM E96-66 (Procedure BW), said hydrophilic elastomer is a copolyetherester elastomer having a multiplicity of long-chain ester units and short-chain ester units joined head-to-tail through ester linkages represented by formulae (I) and (II) above and having the values given above with the proviso that the amount of ethylene oxide groups incorporated in the copolyetherester by the poly(alkylene oxide)glycol is from about 25-68 weight percent based on the total weight of the copolyetherester, and the hydrophilic copolyetherester contains about 25-80 weight percent short-chain ester units; and said bicomponent film of the hydrophobic and hydrophilic layers has a separation ratio for water vapor of at least 1.4 as determined by ASTM E96-66 (Procedure BW).

5. A bicomponent film of claim 4 wherein the poly(alkylene oxide)glycol for the hydrophobic elastomer is poly(tetramethylene oxide)glycol.

6. A bicomponent film of claim 4 wherein the poly(alkylene oxide)glycol for the hydrophobic elastomer is ethylene-oxide capped polypropylene oxide glycol.

7. A bicomponent film of claim 4 wherein the poly(alkylene oxide)glycol for the hydrophilic elastomer is poly(ethylene oxide)glycol.

8. A bicomponent film of claim 4 where at least about 70 percent of the groups represented by R in Formulae (I) and (II) above are 1,4-phenylene radicals and at least about 70 percent of the groups represented by D in Formula (II) above are 1,4-butylene radicals and the sum of the percentages of R groups which are not 1,4-phenylene radicals and the D groups which are not 1,4-butylene radicals does not exceed 30 percent.

9. A bicomponent film of claim 4 wherein the copolyetherester of the hydrophilic elastomer contains 40-60 weight percent short-chain ester units.

10. A bicomponent film of claim 4 wherein the copolyetherester of the hydrophobic elastomer contains 30-60 weight percent short-chain ester units.

11. A bicomponent film of claim 4 wherein the poly(alkylene oxide)glycol of the hydrophobic elastomer is poly(tetramethylene ether)glycol and the poly(alkylene oxide)glycol of the hydrophilic elastomer is poly(ethylene oxide)glycol.

12. A bicomponent film of claim 4 wherein the hydrophilic layer contains an inorganic filler.

13. A bicomponent film of claim 1 wherein the hydrophobic elastomer is covered with a textile material.

14. A bicomponent film of claim 2 wherein the hydrophobic elastomer is covered with a textile material.

15. A bicomponent film of claim 3 wherein the hydrophobic elastomer is covered with a textile material.

16. A bicomponent film of claim 4 wherein the hydrophobic elastomer is covered with a textile material.

17. A bicomponent film of claim 5 wherein the hydrophobic elastomer is covered with a textile material.

18. A bicomponent film of claim 6 wherein the hydrophobic elastomer is covered with a textile material.

19. A bicomponent film of claim 7 wherein the hydrophobic elastomer is covered with a textile material.

20. A bicomponent film of claim 8 wherein the hydrophobic elastomer is covered with a textile material.

21. A bicomponent film of claim 9 wherein the hydrophobic elastomer is covered with a textile material.

22. A bicomponent film of claim 10 wherein the hydrophobic elastomer is covered with a textile material.

23. A bicomponent film of claim 11 wherein the hydrophobic elastomer is covered with a textile material.

24. A bicomponent film of claim 12 wherein the hydrophobic elastomer is covered with a textile material.

25. A flexible layered product comprising:
(1) a textile material,
(2) a bicomponent film of a hydrophobic layer and a hydrophilic layer of copolyetherester elastomers bonded together which permits differential transfer of water vapor to prevent buildup of moisture which comprises, (A) a continuous layer of a hydrophobic elastomer 0.05–0.3 mil thick adhered to the textile material and having a water vapor transmission rate of about 800–1200 gm.mil/m²/24 hrs., according to ASTM E96-66 (Procedure BW), said hydrophobic elastomer is a copolyetherester elastomer having a multiplicity of recurring long-chain ester units and short-chain ester units joined head-to-tail through ester linkages, said long-chain ester units being represented by the formula

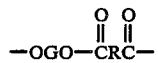  (I)

and said short-chain ester units being represented by the formula:

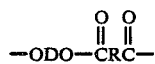  (II)

where G is a divalent radical remaining after the removal of terminal hydroxyl groups from a poly(alkylene oxide)glycol having a molecular weight of about 400–3500, and further, the amount of ethylene oxide groups incorporated in the copolyetherester by the poly(alkylene oxide)glycol is not greater than about 20 weight percent based upon the total weight of the elastomer; R is a divalent radical remaining after removal of carboxyl groups from an aromatic dicarboxylic acid having a molecular weight less than 300; and D is a divalent radical remaining after removal of hydroxyl groups from a diol having a molecular weight less than about 250; said hydrophobic elastomer has about 30–60 weight percent short-chain ester units;

(B) a continuous layer of hydrophilic elastomer 0.3–6 mils thick adhered to the hydrophobic layer and having a water vapor transmission rate of about 3500–20,000 gm.mil/m²/24 hrs., according to ASTM E96-66 (Procedure BW), said hydrophilic elastomer is a copolyetherester elastomer having a multiplicity of long-chain and short-chain ester units joined head-to-tail through ester linkages represented by formulae (I) and (II) above and having the values given above with the proviso that the amount of ethylene oxide groups incorporated in the copolyetherester elastomer by the poly(alkylene oxide)glycol is from about 25–68 weight percent based on the total weight of the elastomer, and the copolyetherester elastomer contains about 40–60 weight percent short-chain ester units; and
said bicomponent film of the hydrophobic and hydrophilic layers has a separation ratio for water vapor of at least about 1.6 as determined by ASTM E96-66 (Procedure BW).

26. A flexible layered product of claim 25 wherein the poly(alkylene oxide)glycol of the hydrophilic elastomer is poly(ethylene oxide)glycol.

27. A flexible layered product of claim 25 wherein the poly(alkylene oxide)glycol of the hydrophobic elastomer is poly(tetramethylene oxide)glycol and the poly(alkylene oxide)glycol of the hydrophilic elastomer is poly(ethylene oxide)glycol.

28. A flexible layered product of claim 25 wherein at least about 70 percent of the groups represented by R in Formulae (I) and (II) above are 1,4-phenylene radicals and at least about 70 percent of the groups represented by D in Formula (II) above are 1,4-butylene radicals and the sum of the percentages of the R groups which are not 1,4-phenylene radicals and the D groups which are not 1,4-butylene radicals does not exceed 30%.

29. A flexible layered product of claim 25 wherein the hydrophilic elastomer contains an inorganic filler.

* * * * *